Aug. 16, 1960
T. R. PAUL
2,949,555
BANDING OR BINDING ELECTRICAL ROTORS OR ARMATURES
Filed Dec. 26, 1957
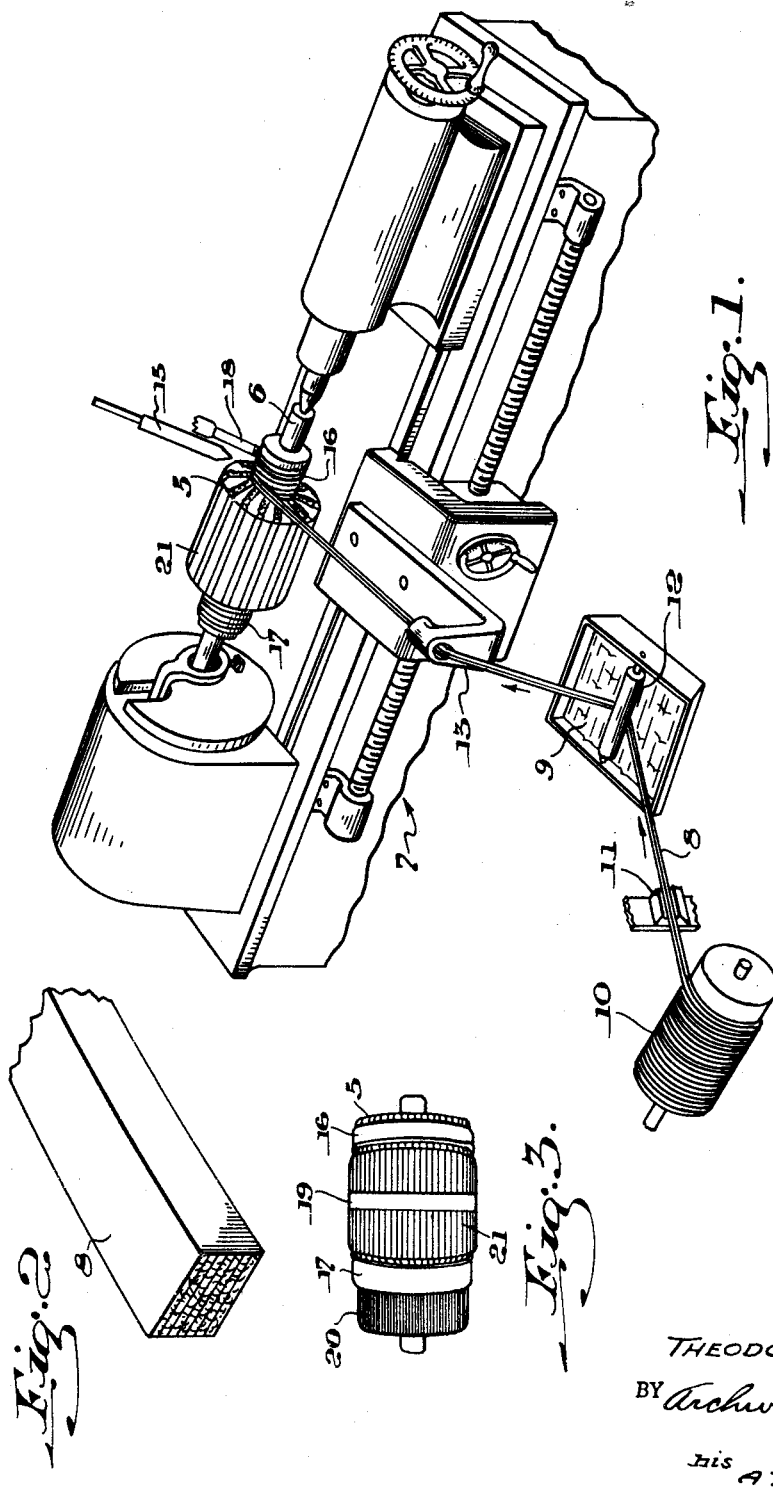
INVENTOR.
THEODORE R. PAUL.
BY Archworth Martin
his ATTORNEY.

United States Patent Office 2,949,555
Patented Aug. 16, 1960

2,949,555
BANDING OR BINDING ELECTRICAL ROTORS OR ARMATURES

Theodore R. Paul, Pittsburgh, Pa. (P.O. Box 10836, Lebanon School Road, West Mifflin Boro, Pa.)

Filed Dec. 26, 1957, Ser. No. 705,254

4 Claims. (Cl. 310—271)

My invention relates to electrical apparatus, and more particularly to the binding or banding of armatures or rotors, including the end turns or loops of the windings that extend beyond the ends of the slots in the armature core and also intermediate straight portions of the wires.

On rotors of this type, provision must of course be made to resist the centrifugal forces to which the windings or coils are subjected at their ends or from open slots. It has been common practice to use steel bands or wire for this purpose, a sleeve or layer of insulating material of course being placed between the band and the coils. While ribbons or bands of glass fibers and the like, impregnated with thermosetting resin, have been employed, they have been impregnated and then stored for perhaps a considerable period of time before being put into use. They necessarily were semi-cured and, therefore, usually kept refrigerated until the time for wrapping them around the coils, or they would become hard and brittle before being used.

My invention has for one of its objects, the provision of a method of preparing and applying fibrous webbing or tape-like materials, to serve as retaining bands of the character referred to.

Another object of my invention is to provide an improved method of coating or impregnating fibrous rovings with a resin and the wrapping thereof about rotor coils and curing the resin.

I hereinafter describe fiber glass as a suitable roving for forming tape or cord, because of its great tensile strength, but various other non-conducting fibers may be used, such as those sold under the trade names of "nylon" and "Dacron."

Roves or webbing formed of such fibers which are arranged in generally parallel relation with one another are passed through a pool of thermo-setting resin that is in a liquid condition and are wound upon the looped coil ends of an electrical rotor, and also around the slotted periphery of the rotor. The roves are then cured or hardened thereon in various ways. For example, heat may be supplied thereto from heat lamps, or the armature can be pre-heated, or the armature may be baked after the fibrous material has been applied. There are some resins which can be cured at room temperature, through the use of a catalyzer. In any case, the fibers are bound together by the resin and the successive turns of the fibrous tape will be tightly wrapped together in a homogeneous hard mass which, at least in the case of glass fibers, will be as effective as steel bands.

Suitable thermo-setting resins can be of the polyester epoxy, silicon or phenolic resins, or other synthetic resins.

In the accompanying drawing:

Figure 1 is a perspective view of the coating apparatus and a rotor mounting for rotative movement when the band is being wound thereon, in somewhat schematic form.

Fig. 2 is an enlarged sectional view through the tape wrapping.

Fig. 3 is a more complete view of a rotor, showing the manner in which straight portions of windings are banded in place in straight slots of a commutator.

The rotor comprises an armature having the usual windings 5 that project from the ends of the slots and has the usual shaft 6 that is mounted in a lathe 7 or the like, whereby it will be rotated for the wrapping or winding of a tape 8 thereon.

The tape is here shown as a fibrous material in rove form, that is, the fibers while generally parallel to one another are loosely arranged, whereby when being drawn through a pool or bath 9 of a thermo-setting resin, they all will become coated with the resin, so that when the roving is wrapped on the rotor the fibers will adhere to one another in compact arrangement.

The roving 8 is drawn from a spool or roll 10 through a tensioning block or guide 11 which is of funnel shape at one end, but is of an internal diameter that will not effect substantial compacting of the fibers, since they must be in rather loose arrangement when passing through the resin at 9. A guide bar 12 which may be in the form of a roller holds the roving below the surface of the resin at 9 and an additional guide 13 directs the roving to the rotor. If desired, the guide 13 could be of such dimension as to also serve as a tensioning device and to have some compacting effect on the strands of the rove. The roller 12 will serve to spread the roving somewhat, thus more effectively exposing the fibers to the resin.

As stated above, the rotor or armature can be preheated to a temperature at which the resin will be hardened as soon as it is wrapped, or extraneous heating may be applied to the tape 8 by a heating lamp 15 or the like.

In any event, the roving will be wound tightly around the coil ends with its successive layers arranged and under some tension so as to secure some compactness of the turns and good density thereof upon curing of the resin. The number of wrappings or turns at 16 and 17 will depend, of course, upon the strength required to hold the coils in place. No fastening means is required for the roving or tape, or other material such as webbing that may be employed as the wrapping, since the thorough impregnation of the fibers by the resin and the wrapping of the same on the rotors, under some light tension will result in a quite dense inflexible body upon curing or hardening of the resin.

A smoothing shoe 18 may suitably be employed to smooth out and densify the layers of rovings as they are wrapped, and before the resin becomes hard.

As shown in Fig. 2, which, although is in the form of a straight bar built up of the tape layers, it is indicative of the appearance of the wrapped bands 16, 17 and 19. The finished band has a glazed surface as shown in this figure, resulting from oozing of the resin by reason of the tension in the tape turns.

Referring now to Fig. 3, a conventional form of commutator is shown at 20 and an armature at 21. Where the armature windings are placed in open slots in the commutator, I will hold them against displacement under centrifugal forces, by tape windings or the like at 19 which will be applied in the same manner as the roving in Fig. 1.

Where catalyzers are used with the resin to render it hardenable upon exposure to the atmosphere, the mixture of catalyzer and resin in the pan 9 will be kept at refrigeration temperatures in the range between 32 degrees and 65 degrees F. Upon exposure to the atmosphere during the wrapping of the rove on the rotor, the resin will harden. Some suitable catalyzers are: methyl ethyl ketone peroxide, benzol peroxide and dicup dicumeral peroxide.

I claim as my invention:

1. The combination with an armature that carries electrical coils adjacent to its periphery, of annular retaining bands of tape-like form disposed circumferentially of the armature and in overlying relation to said coils, each band comprising a roving of non-conductive fibers concentrically arranged in successive layers and bonded in a dense, homogeneous mass by a hardened resin.

2. The combination with an armature that has outwardly open slots extending axially in its peripheral surface and electrical coils in said slots, of annular retaining bands disposed circumferentially of the armature and in overlying relation to said coils and the slots, each band comprising a roving of non-conductive fibers arranged in successive concentric layers and bonded into a dense homogenous mass by a hardened resin.

3. A structure as recited in claim 2, wherein the coils extend beyond the ends of the slots and a roving of non-conductive fibers is wrapped in successive concentric layers in overlying relation to the extended portions of the coils, said fibers and layers being bonded into a homogeneous mass by a hardened resin.

4. The combination with a rotor that has outwardly-open slots extending axially in its peripheral surface and electrical coils in said slots, of annular retaining bands disposed circumferentially of the armature and in overlying relation to said coils and the slots, each band comprising a roving of non-conductive fibers arranged in successive concentric layers and bonded into a dense homogeneous mass by a hardened resin, the resin being in sufficient quantity to form a glazed surface on the band.

References Cited in the file of this patent

UNITED STATES PATENTS

| | | |
|---|---|---|
| 247,082 | Manly et al. | Sept. 13, 1881 |
| 2,188,170 | Zschau | Jan. 23, 1940 |
| 2,381,533 | Forss | Aug. 7, 1945 |
| 2,644,029 | Travis | June 30, 1953 |
| 2,739,371 | Grisdale | Mar. 27, 1956 |
| 2,747,119 | Petersen et al. | May 22, 1956 |